United States Patent
Li

(10) Patent No.: US 10,282,022 B2
(45) Date of Patent: May 7, 2019

(54) CONTROL METHOD AND CONTROL DEVICE FOR WORKING MODE OF TOUCH SCREEN

(71) Applicant: GoerTek Technology Co., Ltd., Qingdao, Shandong (CN)

(72) Inventor: Baoli Li, Qingdao (CN)

(73) Assignee: GOERTEK TECHNOLOGY CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/778,913

(22) PCT Filed: Dec. 23, 2016

(86) PCT No.: PCT/CN2016/111817
§ 371 (c)(1),
(2) Date: May 24, 2018

(87) PCT Pub. No.: WO2017/114318
PCT Pub. Date: Jul. 6, 2017

(65) Prior Publication Data
US 2018/0348947 A1    Dec. 6, 2018

(30) Foreign Application Priority Data

Dec. 31, 2015 (CN) .......................... 2015 1 1031593

(51) Int. Cl.
| G06F 3/041 | (2006.01) |
| G06F 3/0488 | (2013.01) |
| G06F 1/16 | (2006.01) |
| G06F 3/038 | (2013.01) |
| G06F 3/0484 | (2013.01) |

(52) U.S. Cl.
CPC ............ *G06F 3/0416* (2013.01); *G06F 1/163* (2013.01); *G06F 3/038* (2013.01); *G06F 3/0488* (2013.01);
(Continued)

(58) Field of Classification Search
CPC ............... G06F 3/0416; G06F 3/04847; G06F 3/04883; G06F 2203/04808; G06F 3/0488; G06F 1/163; G06F 3/038
See application file for complete search history.

(56) References Cited

U.S. PATENT DOCUMENTS

| 2013/0002586 A1 | 1/2013 | Kung |
| 2014/0340338 A1 | 11/2014 | Kim et al. |

(Continued)

FOREIGN PATENT DOCUMENTS

| CN | 103389876 A | 11/2013 |
| CN | 103425415 A | 12/2013 |

(Continued)

OTHER PUBLICATIONS

Chinese Office Action issued in Chinese Patent Application No. 201511031593.9 dated Dec. 25, 2017.

(Continued)

*Primary Examiner* — Dmitriy Bolotin
(74) *Attorney, Agent, or Firm* — Arent Fox LLP

(57) ABSTRACT

Disclosed is a control method and control device for a working mode of a touch screen. The control method comprises: acquiring current touch operation data generated when a user operates a touch screen; performing logic judgment on whether to switch the working mode according to a current working mode of the touch screen and the touch operation data, and if yes, sending a switching signal to a touch screen control chip to enable the touch screen control chip to control and switch the working mode of the touch screen when receiving the switching signal. The operating intent of the user can be automatically identified according to the touch operation data and the current working mode of the touch screen, and the working mode of the touch screen is controlled to be switched to a corresponding mode, (Continued)

thereby the touch operation of the user is facilitated and the user experience optimized.

8 Claims, 2 Drawing Sheets

(52) U.S. Cl.
CPC ...... *G06F 3/04847* (2013.01); *G06F 3/04883* (2013.01); *G06F 2203/04808* (2013.01)

(56) References Cited

U.S. PATENT DOCUMENTS

| | | | |
|---|---|---|---|
| 2015/0029402 A1 | 1/2015 | Tsai et al. | |
| 2015/0347080 A1 | 12/2015 | Shin et al. | |
| 2016/0239201 A1* | 8/2016 | Wang | G06F 3/04883 |
| 2016/0364137 A1* | 12/2016 | Ren | G06F 3/0482 |

FOREIGN PATENT DOCUMENTS

| | | |
|---|---|---|
| CN | 104349195 A | 2/2015 |
| CN | 105045516 A | 11/2015 |
| CN | 105630393 A | 6/2016 |

OTHER PUBLICATIONS

International Search Report and Written Opinion issued in PCT/CN2016/111817 dated Apr. 12, 2017.

European Search Report corresponding to European Application No. 16881107, dated Nov. 6, 2018.

\* cited by examiner

CONTROL METHOD AND CONTROL DEVICE FOR WORKING MODE OF TOUCH SCREEN

CROSS-REFERENCE TO RELATED APPLICATIONS

This is a National Stage entry of International Application No.: PCT/CN2016/111817, filed on Dec. 23, 2016, which claims priority to Chinese Patent Application No. 201511031593.9, filed on Dec. 31, 2015. The disclosures of the priority applications are hereby incorporated in their entirety by reference.

TECHNICAL FIELD

The present disclosure relates to the technical field of terminal devices, and particularly relates to a control method and control device for a working mode of a touch screen.

BACKGROUND

The touch screen is a relatively new inputting device and is the most simple, convenient and natural man-machine interaction mode until now. The touch screen has obvious technical advantages over traditional inputting modes using a keyboard or a mouse, such as simplified interface, improved accuracy, good firmness and durability, quick access to all types of digital media and saved space.

In mobile devices such as a smart phone, the touch screen and the display screen are always formed integrally. The display screen is installed under the touch screen, a detecting component is provided on the top glass layer of the touch screen, and the detecting component is connected to a touch screen controller. When the user is operating on the touch screen using a finger, he can see the icons displayed on the display screen, so when the touch screen and the display screen are formed integrally, the user's operations are explicit and accurate.

However, in wearable devices (such as head-mounted products), the touch screen and the display screen are usually separate. If the user just simply switches the screen, the advantages of the man-machine interaction mode using the touch screen are still obvious. However, when the user wants to position an icon on the touch screen by clicking, the control point of the touch screen and the user interface icon of the display screen are difficult to match since the touch screen and the display screen are separate, so it is difficult to operate, accurate positioning is impossible, and the user experience is poor.

SUMMARY

The present disclosure provides a control method and control device for a working mode of a touch screen, to solve the problem in conventional head-mounted devices that the control point of the touch screen and the user interface icon displayed on the display screen are difficult to match, which results in inconvenient operations and poor user experience.

According to an aspect of the present disclosure, there is provided a control method for a working mode of a touch screen, comprising:

acquiring current touch operation data generated when a user operates a touch screen; and performing logic judgment on whether to switch the working mode according to a current working mode of the touch screen and the touch operation data, and if yes, sending a switching signal to a touch screen controlling chip, to enable the touch screen controlling chip to control and switch the working mode of the touch screen when receiving the switching signal.

Optionally, before the step of performing logic judgment on whether to switch the working mode according to a current working mode of the touch screen and the touch operation data, the method further comprises:

setting in advance a configuration option to turn on or turn off the automatic switching of the working mode of the touch screen in a system configuration file; and reading state information of the configuration option, and performing logic judgment on whether to switch the working mode according to a current working mode of the touch screen and the touch operation data when the configuration option is in a turned-on state.

Optionally, the working modes of the touch screen comprise: a hand gesture mode and a simulated mouse mode; and the step of performing logic judgment on whether to switch the working mode according to a current working mode of the touch screen and the touch operation data comprises:

when the current working mode of the touch screen is the hand gesture mode, and the touch operation data are single-finger slow and continuous moving operation data, determining to switch the working mode, generating a first switching signal for switching the current working mode to the simulated mouse mode, and sending the first switching signal to the touch screen controlling chip;

when the current working mode of the touch screen is the hand gesture mode, and a user interaction tool of the head-mounted device changes from an externally connected physical mouse to the touch screen, and the received touch operation data are single-finger slow and continuous moving operation data, determining to switch the working mode, generating a first switching signal for switching the current working mode to the simulated mouse mode, and sending the first switching signal to the touch screen controlling chip;

when the current working mode of the touch screen is the simulated mouse mode, and the touch operation data are multiple-finger operation data, determining to switch the working mode, generating a second switching signal for switching the current working mode to the hand gesture mode, and sending the second switching signal to the touch screen controlling chip; and when the current working mode of the touch screen is the simulated mouse mode, and the touch operation data are single-finger quick sliding operation data, determining to switch the working mode, generating a second switching signal for switching the current working mode to the hand gesture mode, and sending the second switching signal to the touch screen controlling chip.

Optionally, the method further comprises:

providing a call interface of a configuration option to turn on or turn off the automatic switching of the working mode of the touch screen to a third party application; and receiving, by the third party application, operation information for turning on the automatic switching of the working mode of the touch screen or operation information for turning off the automatic switching of the working mode of the touch screen that are inputted by the user.

Optionally, the method further comprises: controlling to present a mouse pointer widget on a user interface according to a result of switching after sending the first switching signal to the touch screen controlling chip.

According to another aspect of the present disclosure, there is provided a control device for a working mode of a touch screen that is corresponding to the above control method, comprising:

a data acquiring module, for acquiring current touch operation data of a user;

a working mode controlling module, for performing logic judgment on whether to switch the working mode according to a current working mode of the touch screen and the touch operation data, and if yes, sending a switching signal to a touch screen controlling chip; and the touch screen controlling chip, for controlling and switching the working mode of the touch screen when receiving the switching signal.

Optionally, the device further comprises:

a configuration option setting module, for setting in advance a configuration option to turn on or turn off the automatic switching of the working mode of the touch screen in a system configuration file; and the working mode controlling module is particularly for reading state information of the configuration option, and performing logic judgment on whether to switch the working mode according to a current working mode of the touch screen and the touch operation data when the configuration option is in a turned-on state.

Optionally, the working modes of the touch screen comprise: a hand gesture mode and a simulated mouse mode;

the working mode controlling module particularly comprises: a logical judgment module and a signal generating module; and the logical judgment module is for, when a current working mode of the touch screen is the hand gesture mode, and the touch operation data are single-finger slow and continuous moving operation data, determining to switch the working mode and sending a judgment result to the signal generating module; and the signal generating module is for, according to the judgment result of the logical judgment module, generating a first switching signal for switching the current working mode to the simulated mouse mode, and sending the first switching signal to the touch screen controlling chip;

or, the logical judgment module is for, when a current working mode of the touch screen is the hand gesture mode, and a user interaction tool of the head-mounted device changes from an externally connected physical mouse to the touch screen, and the received touch operation data are single-finger slow and continuous moving operation data, determining to switch the working mode and sending a judgment result to the signal generating module; and the signal generating module is for, according to the judgment result of the logical judgment module, generating a first switching signal for switching the current working mode to the simulated mouse mode, and sending the first switching signal to the touch screen controlling chip;

or, the logical judgment module is for, when a current working mode of the touch screen is the simulated mouse mode, and the touch operation data are multiple-finger operation data, determining to switch the working mode and sending a judgment result to the signal generating module; and the signal generating module is for, according to the judgment result of the logical judgment module, generating a second switching signal for switching the current working mode to the hand gesture mode, and sending the second switching signal to the touch screen controlling chip;

or, the logical judgment module is for, when a current working mode of the touch screen is the simulated mouse mode, and the touch operation data are single-finger quick sliding operation data, determining to switch the working mode and sending a judgment result to the signal generating module; and the signal generating module is for, according to the judgment result of the logical judgment module, generating a second switching signal for switching the current working mode to the hand gesture mode, and sending the second switching signal to the touch screen controlling chip.

Optionally, the device further comprises: a user interaction module, for providing a call interface of a configuration option to turn on or turn off the automatic switching of the working mode of the touch screen to a third party application, and receiving, by the third party application, operation information for turning on the automatic switching of the working mode of the touch screen or operation information for turning off the automatic switching of the working mode of the touch screen that are inputted by the user.

The device further comprises: a mouse pointer presenting module, for controlling to present a mouse pointer widget on a user interface according to a result of switching after sending the first switching signal to the touch screen controlling chip.

The advantageous effects of the present disclosure are as follows. The present disclosure solves the problem that it is not convenient for the user to operate the touch screen when the touch screen and the display screen are separate. The present disclosure acquires the touch operation data of the user, and performs the judgment whether to switch the working mode according to the current working mode of the touch screen to automatically identify the operation intent of the user. When the operation intent of the user is a hand gesture operation application scene (for example, sliding on the touch screen), the working mode of the touch screen is controlled to maintain or switch to the hand gesture mode; when the operation intent of the user is a stimulated mouse operation application scene (for example, clicking an icon on the touch screen), the working mode of the touch screen is controlled to maintain or switch to the simulated mouse mode. Thus, the user can flexibly and conveniently operate the touch screen, and accurately and freely position the icons on the display screen even when the display screen and the touch screen are separate, which optimizes the use experience of the user.

DETAILED DESCRIPTION

The core inventive concept of the present disclosure is as follows. Regarding the problem in the prior art that the separate structure of the touch screen and the display screen results in that it is difficult to accurately position the icons on the display screen when the user operates on the touch screen, which results in inconvenient operations and poor user experience. The present disclosure provides a control method for a working mode of a touch screen in which the operation intent of the user is quickly determined according to the touch operation data of the user and the current working mode of the touch screen, and the working mode of the touch screen is switched to the mode which is convenient for the user to operate, thereby automatically identifying and flexibly switching to the required working mode according to the application scene, and improving the use experience of the user and the competitiveness of the device.

First Embodiment

Figure 1:
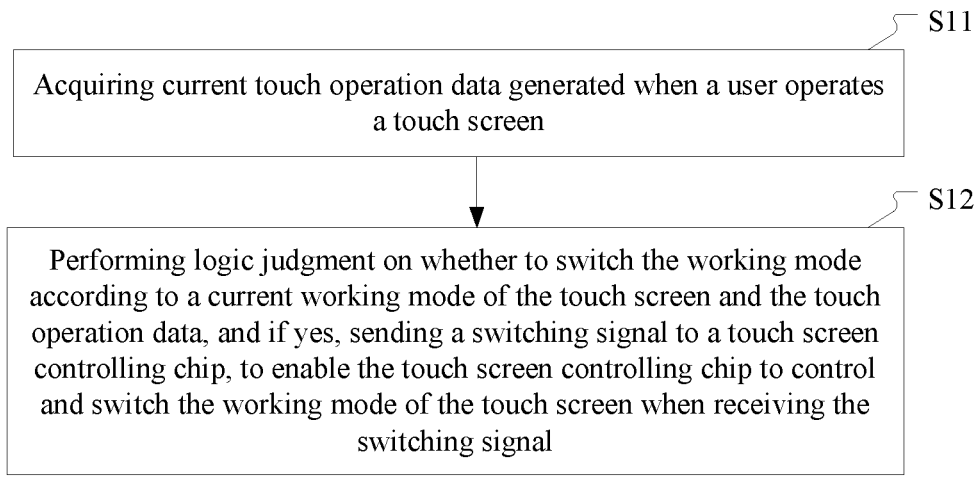
FIG. 1 is a flow chart of a control method for a working mode of a touch screen according to an embodiment of the present disclosure.

FIG. 1 is a control method for a working mode of a touch screen according to an embodiment of the present disclosure. Referring to FIG. 1, the control method for a working mode of a touch screen comprises:

Step S11, acquiring current touch operation data generated when a user operates a touch screen; and Step S12, performing logic judgment on whether to switch the working mode according to a current working mode of the touch screen and the touch operation data, and if yes, sending a switching signal to a touch screen controlling chip, so as to enable the touch screen controlling chip to control and switch the working mode of the touch screen when receiving the switching signal.

According to the method shown in FIG. 1, the operating intent of the user on the touch screen can be automatically identified according to the touch operation data of the user on the touch screen and the current working mode of the touch screen, and the working mode of the touch screen is controlled to be switched to a corresponding mode, thereby facilitating the user to operate flexibly and freely and optimizing the use experience of the user.

Second Embodiment

The working mode of the touch screen according to the embodiment of the present disclosure will be described below by referring to a particular application scene.

In the present embodiment, the working modes of the touch screen comprise a simulated mouse mode and a hand gesture mode. The simulated mouse mode is adapted for the application scenes where the user conducts simulated mouse operations on the touch screen, such as icon operation options, single click options and double click opening. Further, the hand gesture mode is adapted for the application scenes where the user conducts hand gesture operations on the touch screen, such as sliding the screen to unblock and switching the screen interface.

It should be noted that, the reason for controlling and switching the working modes of the touch screen is that, if the working mode of the touch screen cannot be adapted to the change of the application scenes of the head-mounted device, it will be very inconvenient when the user conducts touch control operations. For example, when the user is playing a game using a head-mounted device, he may externally connect a physical mouse to facilitate the flexible controlling on the game. However, when the user wants to switch to touch screen operations to get a better user interaction experience, preferably, the working mode of the touch screen is set to the simulated mouse mode, so that the user will not notice the difference between the operations of the externally connected physical mouse and the touch control operations of the touch screen. In addition, when the touch screen is working in the simulated mouse mode, if the user wants to use multiple-point touch operations (such as a two-finger operation for zooming a picture), the working mode of the touch screen needs to be switched to the hand gesture mode according to the touch operation of the user. Thereby, the method of the present embodiment automatically identifies the current application scene of the user, controls and switches the working mode of the touch screen, thereby improving the flexibility of operations and ensuring a good feeling of operations.

The present embodiment is illustrated by taking a head-mounted device as an example. The head-mounted device comprises a touch screen and a display screen, and the touch screen and the display screen are separate. In addition, the Android system runs in the head-mounted device. Android is a free and open source Linux-based operating system mainly applied in mobile devices.

Figure 2:
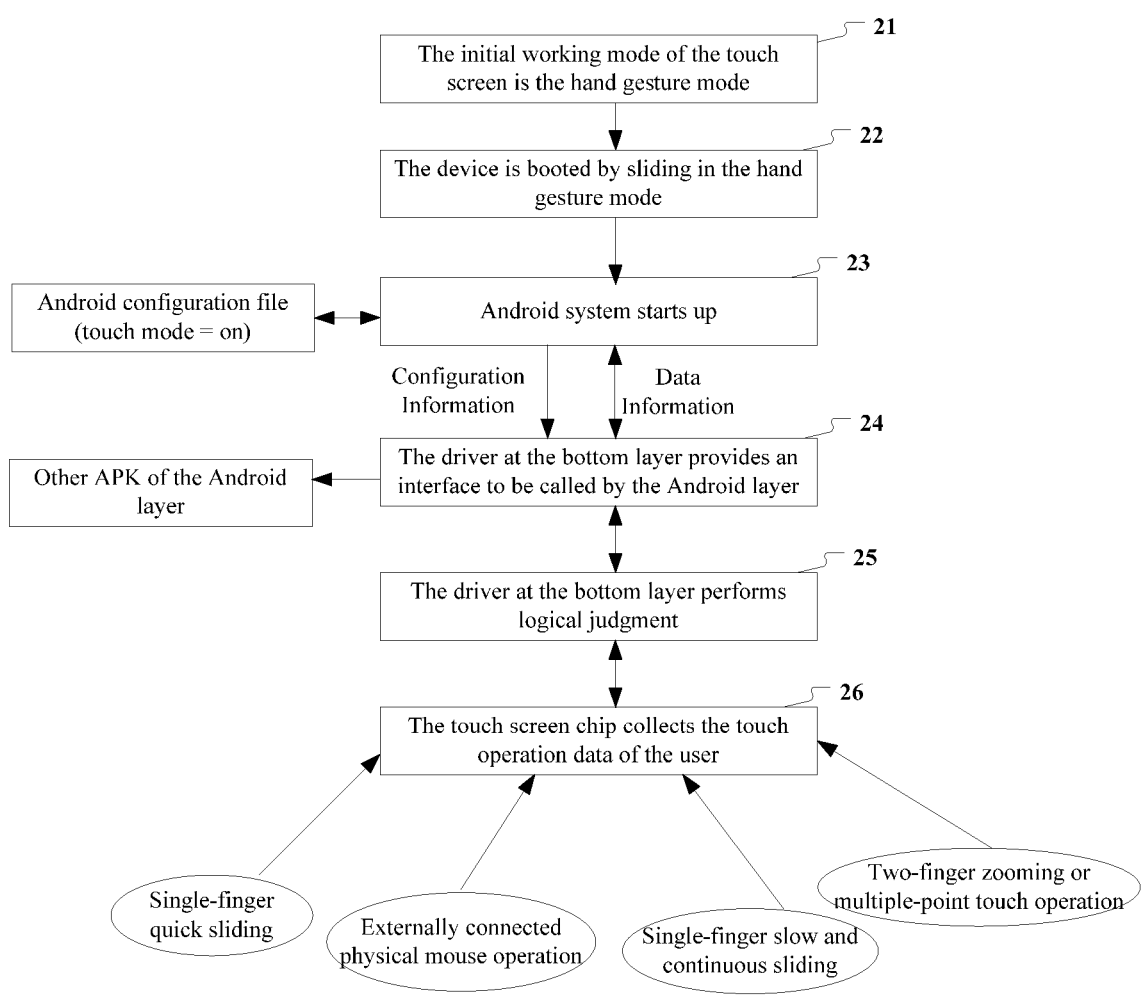
FIG. 2 is a schematic flow chart of a control method for a working mode of a touch screen according to another embodiment of the present disclosure.
Figure 3:
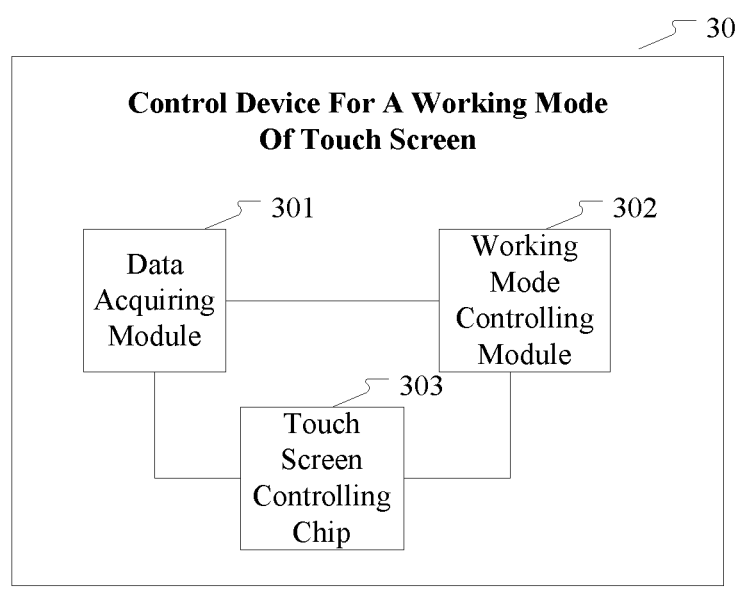
FIG. 3 is a block diagram of a control device for a working mode of a touch screen according to an embodiment of the present disclosure.

FIG. 2 is a schematic flow chart of a control method for a working mode of a touch screen according to another embodiment of the present disclosure. Compared with the prior art, the control method for a working mode of a touch screen according to the present embodiment have the following advantages. First, the configuration options of the working modes of the simulated mouse mode and the hand gesture mode are provided in the configuration files of the Android layer, and the default setting of the configuration option is turning on the automatic identifying and switching of the simulated mouse mode and the hand gesture mode. Second, an interface to turn on and turn off the configuration option is provided to the application developer of the Android layer, to facilitate the developing of third party applications. Third, the automatic identifying and switching of the simulated mouse mode and the hand gesture mode can be achieved according to the selection of the user and the change of the application scenes.

Referring to FIG. 2, the automatic switching function of the working mode of the touch screen of the head-mounted device is realized by the control method for a working mode of a touch screen according to the present embodiment. Specially, 21. The initial working mode of the touch screen is the hand gesture mode.

In the present embodiment, after the touch screen is initialized, the default working mode is the hand gesture mode, so as to realize the function of unblocking by hand gesture sliding after the starting up. This also matches the custom of unblocking by sliding to operate conventional devices such as smart phones, and thus is easily accepted by the user.

22. The device is booted by sliding in the hand gesture mode.

The booting is completed by receiving the sliding operation on the touch screen by the user in the hand gesture mode. After the head-mounted device is unblocked and booted, there are probably two operations of the user to be handled. One operation is switching the screen (namely, switching the current user interface). For screen switching, operations in the hand gesture mode are convenient and flexible (for example, screen rolls leftward if the finger slides leftward, and it rolls rightward if the finger slides rightward), so the working mode of the touch screen should be maintained in the initial hand gesture mode. The other operation is operating the icons on the current user interface that is displayed on the display screen. If a certain icon on the current display screen needs operating, the working mode should be switched to the mouse mode, so that the user accurately positions the location of the icon on the display screen.

23. The Android system starts up.

It should be noted that, in order to realize the automatic switching of the working mode of the touch screen, in the present embodiment, a configuration option to turn on or turn off the automatic switching of the working mode of the touch screen (see the touch mode option shown in FIG. 2)

is set in advance in the configuration files of the Android system. In this way, every time the Android system starts up, the state information of the configuration option in the configuration files of the Android system will be read, such as whether the function of automatically switching the working mode of the current configuration option is in the turned-on state or the turned-off state, and when the configuration option is in the turned-on state (see the "touch mode=on" shown in FIG. 2), the state information is sent to a driver application at the bottom layer, so that the driver application performs logical judgment on whether to switch the working mode according to the current working mode of the touch screen and the touch operation data.

24. The driver at the bottom layer provides an interface to be called by the Android layer. The driver at the bottom layer needs to conduct data interaction with the Android layer at an upper layer, for example, to acquire the information about how the user operates the configuration option and know whether the function of automatically switching the working mode of the touch screen is currently in the turned-on state, so the driver at the bottom layer needs to provide an interface to be called by the Android layer, and acquire the state information of the configuration option from the upper layer (the Android layer) via the call interface, or upload the information of the processing result to the Android layer, to realize the data interaction.

Furthermore, in order to provide a good user interaction experience and enhance the operation feeling of the user, in the present embodiment, the Android layer further provides the call interface of the configuration option to turn on or turn off the automatic switching of the working mode of the touch screen to a third party application (namely, the other APK of the Android layer shown in FIG. 2), and receives operation information for turning on the automatic switching of the working mode of the touch screen or operation information for turning off the automatic switching of the working mode of the touch screen that are inputted by the user through the third party application. The Android Package (APK) can be installed by directly transmitting the APK file to the Android device (in the present embodiment, the head-mounted device) and executing it.

As the call interface of the configuration option to turn on or turn off the automatic switching of the working mode of the touch screen is provided to a third party application, after the third party application after developed is installed to the head-mounted device, the user may open the third party application in the head-mounted device, find the configuration option of automatically switching the working mode of the touch screen in the interface of the third party application, and input a selection operation of turning on the automatic switching of the working mode of the touch screen or turning off the automatic switching of the working mode of the touch screen.

25. The driver at the bottom layer performs logical judgment.

The driver at the bottom layer acquires the touch operation data of the user from a touch screen controlling chip, and performs logical judgment by referring to the current working mode of the touch screen that is acquired from the Android layer, thereby obtain the advantageous effect of automatically switching the working mode of the touch screen according to the application scene.

Particularly, in judgment (1), when the current working mode of the touch screen is the hand gesture mode, and the touch operation data are single-finger slow and continuous moving operation data, it is determined to switch the working mode, and a first switching signal for switching the current working mode to the simulated mouse mode is generated and sent to the touch screen controlling chip.

Here, the single-finger slow and continuous moving operation data refers to the data generated when a single finger is moving slowly and continuously on the touch screen. The speed refers to the number of the coordinate points that the user slides over per unit time. The "slow" refers to that the number of the coordinate points that the user slides over in a single operation is lower than a preset number threshold. The preset threshold may be the number of the coordinate points that the user slides over in a screen switching operation by hand gesture. In addition, "continuous" means the continuity in the operation time; namely, the operation time reaches a preset time threshold. For example, in the present embodiment, the preset time threshold is 0.8 second. Namely, only if the duration of sliding operation of the user, from the beginning to the end of the sliding operation, is above 0.8 second, the touch operation data of the user are determined to be single-finger slow and continuous moving operation data, otherwise they may be determined as a misoperation, and the system does not execute the working mode switching.

In judgment (2), when the current working mode of the touch screen is the hand gesture mode, and the user interaction tool of the head-mounted device changes from an externally connected physical mouse to the touch screen, and the received touch operation data are single-finger slow and continuous moving operation data, it is determined to switch the working mode, and a first switching signal for switching the current working mode to the simulated mouse mode is generated and sent to the touch screen controlling chip.

The scene here is that, the touch screen is currently working in the hand gesture mode, and at this point the user externally connects a physical mouse to the head-mounted device and conducts the man-machine interaction of the head-mounted device by using the physical mouse (see the description in the above part that the user externally connects a physical mouse when playing a game). When the user is using the externally connected physical mouse, there are no user operation data on the touch screen. When the user inputs touch operation data on the touch screen again (namely, the operation intent of the user is to switch the man-machine interaction mode of the head-mounted device to the touch screen), if at this point the touch screen is still working in the hand gesture mode, the user experience is not good and the operation feelings are quite different since there is not a good linking from the externally connected physical mouse operation to the hand gesture mode, the user can obviously feel such a switching. Therefore, in the present embodiment, after judging according to the touch operation data of the user, the working mode of the touch screen is controlled to switch to the simulated mouse mode, thereby facilitating flexible operating by the user; moreover, the user interface is consistent with the user interface when a physical mouse is externally connected, which does not affect the operation experience of the user.

It should be emphasized that, in both the judgment (1) and judgment (2) above, the working mode of the touch screen is switched to the simulated mouse mode, which requires to correspondingly display a mouse pointer (including the mouse cursor) on the user interface of the display screen to facilitate the accurately positioning and flexibly operating of the user. Therefore, in the present embodiment, the method further comprises controlling to present a mouse pointer widget on a user interface according to a result of switching after sending the first switching signal to the touch screen controlling chip.

In judgment (3), when the current working mode of the touch screen is the simulated mouse mode, and the touch operation data are multiple-finger operation data, it is determined to switch the working mode, a second switching signal for switching the current working mode to the hand gesture mode is generated and sent to the touch screen controlling chip.

The multiple-finger operation data comprise the data generated when the user conducts touch control operations by using two or more fingers. For example, when the user is browsing the pictures on the display screen and wants to zoom in or zoom out the picture being watched, he must operate the touch screen by using two cooperating fingers. When the touch screen captures the two-finger operation data of the user, it is determined that the current application scene is a hand gesture operation scene, and thus the working mode of the touch screen needs to be switched to the hand gesture mode, so as to match the application scene.

In judgment (4), when the current working mode of the touch screen is the simulated mouse mode, and the touch operation data are single-finger quick sliding operation data, it is determined to switch the working mode, a second switching signal for switching the current working mode to the hand gesture mode is generated and sent to the touch screen controlling chip.

The single-finger quick sliding operation data comprise the data generated when the user conducts touch control operations by quick sliding using a single finger. For example, when the user is switching the user interface on the display screen, and the touch screen captures the single-finger quick sliding of the user, it is determined that the current application scene is a hand gesture operation scene, and thus the working mode of the touch screen needs to be switched to the hand gesture mode, so as to match the application scene. The "quick" here may be understood as that the number of the coordinate points that the user slides over when operating on the touch screen per unit time is greater than a preset number threshold. The particular number threshold may be set according to the demands of practical use, which is not discussed here in detail.

26. The touch screen chip collects the touch operation data of the user.

It should be noted that, the touch operation data of the user that are collected by the touch screen chip are transmitted to the driver at the bottom layer in real time, to facilitate the driver at the bottom layer performing logical judgment by using these data, namely, judging whether to conduct the switching of the working mode of the touch screen. The touch operation data of the user comprise: single-finger quick sliding operation data, externally connected physical mouse operation data, single-finger slow and continuous sliding operation data, and two-finger zooming or multiple-point touch operation data.

All of the current touch screens support clicking operation. Head-mounted devices that are equipped with a touch screen have two types of touch control inputting modes. One is that a Linux driver at the bottom layer of the Android system of the head-mounted device acquires consecutive touch point coordinates that are inputted by the user from the touch screen controlling chip of the head-mounted device, and sends the acquired consecutive touch point coordinates upward to the Android layer by means of an Input event, so that an Android layer application at an upper layer determines the current working mode of the touch screen according to the coordinate points or the hand gesture operation information. The existing mainstream touch screens also support the hand gesture mode. The Linux driver at the bottom layer of the head-mounted device may also acquire the hand gesture operation information of the user from the touch screen controlling chip, and sends it upward to the Android layer by means of an Input event, so that the Android layer application at the upper layer determines the current working mode according to the coordinate points or the hand gesture operation. It can be understood that, when the touch screen is working in the simulated mouse mode, the Linux driver acquires the consecutive touch point coordinates from the touch screen controlling chip, and when the touch screen is working in the hand gesture mode, the Linux driver acquires the hand gesture information of a single touch operation of the user from the touch screen controlling chip. In addition, no matter whether the Linux driver acquires the hand gesture information or the consecutive touch point coordinates from the touch screen controlling chip, they will be sent upward to the Android layer according to the corresponding Input event.

Thus, regarding electronic products in which the display screen and the touch screen are separate, when the user conducts touch and control operations using this type of devices, by using the control method for a working mode of a touch screen of the present embodiment, the problems that the display screen icon is difficult to operate and the user experience is poor are effectively solved, the interface operation feeling and operation flexibility in use are improved, and the competitiveness of the product is increased.

Third Embodiment

According to another aspect of the present disclosure, there is further provided a control device for a working mode of a touch screen 30 which comprises:

a data acquiring module 301, for acquiring current touch operation data of a user;

a working mode controlling module 302, for performing logic judgment on whether to switch the working mode according to a current working mode of the touch screen and the touch operation data, and if yes, sending a switching signal to a touch screen controlling chip 303; and the touch screen controlling chip 303, for controlling and switching the working mode of the touch screen when receiving the switching signal.

In the present embodiment, the device 30 further comprises:

a configuration option setting module, for setting in advance a configuration option to turn on or turn off the automatic switching of the working mode of the touch screen in a system configuration file; and the working mode controlling module is particularly for reading state information of the configuration option, and when the configuration option is in a turned-on state, performing logic judgment on whether to switch the working mode according to a current working mode of the touch screen and the touch operation data.

In the present embodiment, the working modes of the touch screen comprise: a hand gesture mode and a simulated mouse mode;

the working mode controlling module particularly comprises: a logical judgment module and a signal generating module; and the logical judgment module is for, when a current working mode of the touch screen is the hand gesture mode, and the touch operation data are single-finger slow and continuous moving operation data, determining to switch the working mode and sending a judgment result to the signal generating module; and the signal generating module is for, according to the judgment result of the logical judgment module, generating a first switching signal for switching the current working mode to the simulated mouse mode, and sending the first switching signal to the touch screen controlling chip;

or, the logical judgment module is for, when a current working mode of the touch screen is the hand gesture mode, and a user interaction tool of the head-mounted device changes from an externally connected physical mouse to the touch screen, and the received touch operation data are single-finger slow and continuous moving operation data, determining to switch the working mode and sending a judgment result to the signal generating module; and the signal generating module is for, according to the judgment result of the logical judgment module, generating a first switching signal for switching the current working mode to the simulated mouse mode, and sending the first switching signal to the touch screen controlling chip;

or, the logical judgment module is for, when a current working mode of the touch screen is the simulated mouse mode, and the touch operation data are multiple-finger operation data, determining to switch the working mode and sending a judgment result to the signal generating module; and the signal generating module is for, according to the judgment result of the logical judgment module, generating a second switching signal for switching the current working mode to the hand gesture mode, and sending the second switching signal to the touch screen controlling chip;

or, the logical judgment module is for, when a current working mode of the touch screen is the simulated mouse mode, and the touch operation data are single-finger quick sliding operation data, determining to switch the working mode and sending a judgment result to the signal generating module; and the signal generating module is for, according to the judgment result of the logical judgment module, generating a second switching signal for switching the current working mode to the hand gesture mode, and sending the second switching signal to the touch screen controlling chip.

In the present embodiment, the device 30 further comprises: a user interaction module, for providing a call interface of a configuration option to turn on or turn off the automatic switching of the working mode of the touch screen to a third party application, so that operation information for turning on automatic switching of the working mode of the touch screen or operation information for turning off the automatic switching of the working mode of the touch screen that are inputted by the user are received by the third party application.

In the present embodiment, the device 30 further comprises: a mouse pointer presenting module, for controlling to present a mouse pointer widget on a user interface according to a result of switching after sending the first switching signal to the touch screen controlling chip.

It should be noted that, the working process of the control device for a working mode of a touch screen of the present embodiment is corresponding to the steps of the above control method for a working mode of a touch screen. Therefore, the details of the working process of the control device for a working mode of a touch screen of the present embodiment may refer to the description of relevant part of the above control method for a working mode of a touch screen, and are not repeated here.

In conclusion, according to the control method and control device for a working mode of a touch screen of the embodiments of the present disclosure, when the current application scene is identified to be a hand gesture operation scene, the working mode of the touch screen is automatically controlled to switch to the hand gesture mode, and when the current application scene is identified to be a stimulated mouse operation scene, the working mode of the touch screen is automatically controlled to switch to the simulated mouse mode. When the display screen and the touch screen are separate, the user can still accurately and freely position the icons of the display screen and conduct subsequent operations, which optimizes the use experience of the user. The present disclosure solves the problem that when the touch screen and the display screen are separate, the control points of the touch screen and the user interface icons displayed on the display screen are difficult to match, which results in inconvenient operations and poor user experience, thereby satisfying the current operation custom of touch control of the user, making the touch control operations on the touch screen more flexible, convenient and effective, and improving the competitiveness of the product.

It should be noted that, the above description is not intended to limit the present disclosure, and the present disclosure is not limited to the above examples. The variations, modifications, additions or replacements made by a person skilled in the art without departing from the spirit and scope of the present disclosure are also within the protection scope of the present disclosure.

What is claimed is:

1. A control method for a working mode of a touch screen, comprising:

acquiring current touch operation data generated when a user operates a touch screen; and performing logic judgment on whether to switch the working mode according to a current working mode of the touch screen and the touch operation data, and if yes, sending a switching signal to a touch screen controlling chip, to enable the touch screen controlling chip to control and switch the working mode of the touch screen when receiving the switching signal;

wherein the working modes of the touch screen comprise: a hand gesture mode and a simulated mouse mode; and the step of performing logic judgment on whether to switch the working mode according to a current working mode of the touch screen and the touch operation data comprises:

when the current working mode of the touch screen is the hand gesture mode, and the touch operation data are single-finger slow and continuous moving operation data, determining to switch the working mode, generating a first switching signal for switching the current working mode to the simulated mouse mode, and sending the first switching signal to the touch screen controlling chip;

when the current working mode of the touch screen is the hand gesture mode, and a user interaction tool of a head-mounted device changes from an externally connected physical mouse to the touch screen, and the received touch operation data are single-finger slow and continuous moving operation data, determining to switch the working mode, generating a first switching signal for switching the current working mode to the simulated mouse mode, and sending the first switching signal to the touch screen controlling chip;

when the current working mode of the touch screen is the simulated mouse mode, and the touch operation data are multiple-finger operation data, determining to switch the working mode, generating a second switching signal for switching the current working mode to the hand gesture mode, and sending the second switching signal to the touch screen controlling chip; and when the current working mode of the touch screen is the simulated mouse mode, and the touch operation data are single-finger quick sliding operation data, determining to switch the working mode, generating a second switching signal for switching the current working mode to the hand gesture mode, and sending the second switching signal to the touch screen controlling chip.

2. The method according to claim 1, wherein before the step of performing logic judgment on whether to switch the working mode according to a current working mode of the touch screen and the touch operation data, the method further comprises:

setting in advance a configuration option to turn on or turn off the automatic switching of the working mode of the touch screen in a system configuration file; and reading state information of the configuration option, and performing logic judgment on whether to switch the working mode according to a current working mode of the touch screen and the touch operation data when the configuration option is in a turned-on state.

3. The method according to claim 2, further comprising:
providing a call interface of a configuration option to turn on or turn off the automatic switching of the working mode of the touch screen to a third party application; and receiving, by the third party application, operation information for turning on the automatic switching of the working mode of the touch screen or operation information for turning off the automatic switching of the working mode of the touch screen that are inputted by the user.

4. The method according to claim 1, further comprising:
controlling to present a mouse pointer widget on a user interface according to a result of switching after sending the first switching signal to the touch screen controlling chip.

5. A control device for a working mode of a touch screen, comprising:

a data acquiring module, for acquiring current touch operation data of a user;

a working mode controlling module, for performing logic judgment on whether to switch the working mode according to a current working mode of the touch screen and the touch operation data, and if yes, sending a switching signal to a touch screen controlling chip; and the touch screen controlling chip, for controlling and switching the working mode of the touch screen when receiving the switching signal;

wherein the working modes of the touch screen comprise: a hand gesture mode and a simulated mouse mode;

the working mode controlling module particularly comprises: a logical judgment module and a signal generating module; and the logical judgment module is for, when a current working mode of the touch screen is the hand gesture mode, and the touch operation data are single-finger slow and continuous moving operation data, determining to switch the working mode and sending a judgment result to the signal generating module; and the signal generating module is for, according to the judgment result of the logical judgment module, generating a first switching signal for switching the current working mode to the simulated mouse mode, and sending the first switching signal to the touch screen controlling chip;

or, the logical judgment module is for, when a current working mode of the touch screen is the hand gesture mode, and a user interaction tool of a head-mounted device changes from an externally connected physical mouse to the touch screen, and the received touch operation data are single-finger slow and continuous moving operation data, determining to switch the working mode and sending a judgment result to the signal generating module; and the signal generating module is for, according to the judgment result of the logical judgment module, generating a first switching signal for switching the current working mode to the simulated mouse mode, and sending the first switching signal to the touch screen controlling chip;

or, the logical judgment module is for, when a current working mode of the touch screen is the simulated mouse mode, and the touch operation data are multiple-finger operation data, determining to switch the working mode and sending a judgment result to the signal generating module; and the signal generating module is for, according to the judgment result of the logical judgment module, generating a second switching signal for switching the current working mode to the hand gesture mode, and sending the second switching signal to the touch screen controlling chip;

or, the logical judgment module is for, when a current working mode of the touch screen is the simulated mouse mode, and the touch operation data are single-finger quick sliding operation data, determining to switch the working mode and sending a judgment result to the signal generating module; and the signal generating module is for, according to the judgment result of the logical judgment module, generating a second switching signal for switching the current working mode to the hand gesture mode, and sending the second switching signal to the touch screen controlling chip.

6. The device according to claim 5, further comprising: a configuration option setting module, for setting in advance a configuration option to turn on or turn off the automatic switching of the working mode of the touch screen in a system configuration file; and the working mode controlling module is particularly for reading state information of the configuration option, and performing logic judgment on whether to switch the working mode according to a current working mode of the touch screen and the touch operation data when the configuration option is in a turned-on state.

7. The device according to claim 6, further comprising:
a user interaction module, for providing a call interface of a configuration option to turn on or turn off the automatic switching of the working mode of the touch screen to a third party application, and receiving, by the third party application, operation information for turning on the automatic switching of the working mode of the touch screen or operation information for turning off the automatic switching of the working mode of the touch screen that are inputted by the user.

8. The device according to claim 5, further comprising:
a mouse pointer presenting module, for controlling to present a mouse pointer widget on a user interface according to a result of switching after sending the first switching signal to the touch screen controlling chip.

\* \* \* \* \*